Sept. 20, 1955     D. O. NELSON ET AL     2,718,161
TWO SPEED TRANSMISSION ACTUATED
BY REVERSAL OF DRIVE SHAFT
Filed March 9, 1953

B. G. Blackman
D. O. Nelson
        INVENTORS

BY *Woodbury*
        ATTORNEY

United States Patent Office 2,718,161
Patented Sept. 20, 1955

2,718,161

TWO SPEED TRANSMISSION ACTUATED BY REVERSAL OF DRIVE SHAFT

Donald O. Nelson and Birt G. Blackman, Los Angeles, Calif., assignors to Bendix Aviation Corporation, North Hollywood, Calif., a corporation of Delaware Application March 9, 1953, Serial No. 341,258

3 Claims. (Cl. 74—812)

This invention relates to speed changing gear boxes or transmissions, and more particularly to a gear box in which the speed change in the output shaft is effected by reversing the direction of rotation of the input shaft.

An object of the invention is to provide a simple, inexpensive and practicable structure for shifting speed in response to reversal of the direction of rotation of the input shaft.

Other more specific objects and features of the invention will appear from the description to follow.

A full understanding of the invention may be had from the following detailed description with reference to the drawing, in which.

Figure 1:
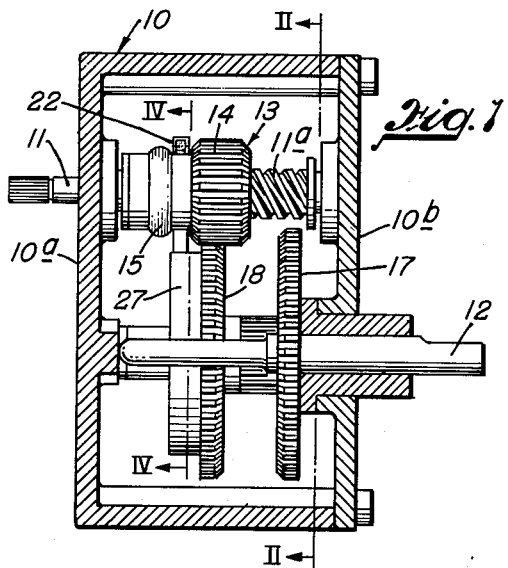
Fig. 1 is a longitudinal vertical section through a gear box in accordance with the invention, the section being taken in the plane I—I of Fig. 2.

Referring to the drawing, the gear box therein disclosed comprises a casing 10 having an input or drive shaft 11 and an output or driven shaft 12. The function of the mechanism within the casing 10 is to rotate the driven shaft 12 at one speed in one direction in response to rotation of the drive shaft 11 in one direction and to rotate the driven shaft 12 at a different speed but in the same direction as before in response to rotation of the drive shaft 11 in the opposite direction.

Figure 3:
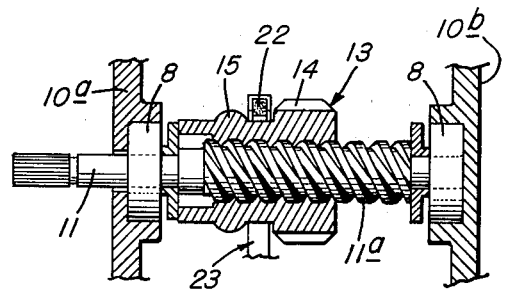
Fig. 3 is a vertical section in the plane III—III of Fig. 2.
Figure 4:
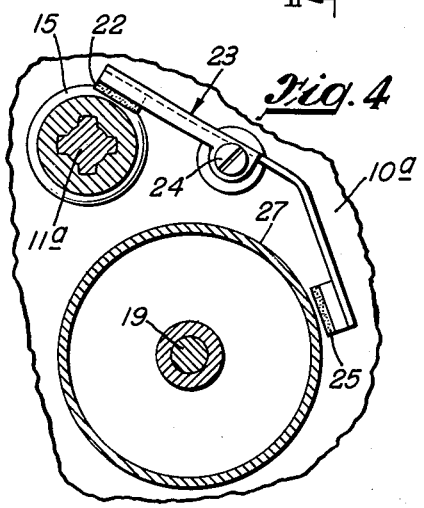
Fig. 4 is a cross section in the plane IV—IV of Fig. 1.
Figure 2:
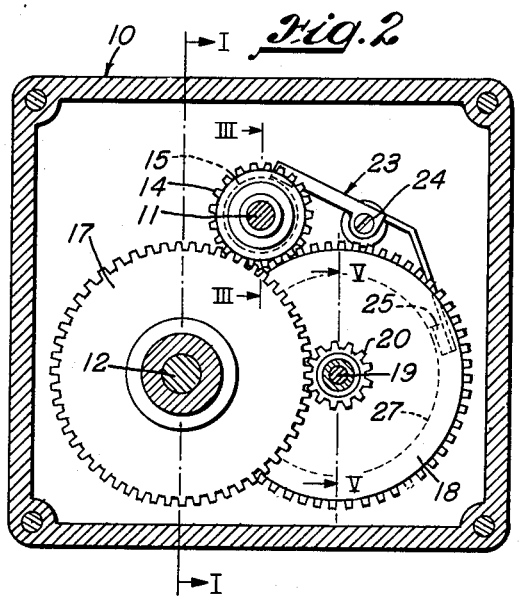
Fig. 2 is a cross section in the plane II—II of Fig. 1.
Figure 5:
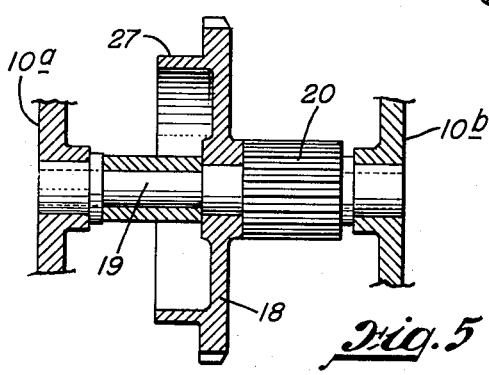
Fig. 5 is a vertical section in the plane V—V of Fig. 2.

As best shown in Fig. 3, the drive shaft 11 is rotatably supported by ball bearings 8, 8 in opposite walls 10a and 10b respectively of the casing 10. The major portion of the drive shaft 11 intermediate the casing walls 10a and 10b is provided with external screw threads 11a, and a nut member 13 rides on the threads 11a. The nut member 13 carries a first gear 14 and a first brake hub 15, the latter being in the form of an annular ridge on the member 13.

Movement of the nut member 13 between its limits of motion along the threaded portion 11a of the input shaft 11 shifts it between a first position in which the gear 14 meshes with a second gear 17 on the driven shaft 12 and a second position (shown in Fig. 1) in which the gear 14 meshes with a third gear 18 on a counter shaft 19 which is journaled in the casing walls 10a and 10b. The counter shaft 19 also carries a gear 20 smaller than the gear 18, the gear 20 meshing at all times with the second gear 17, so that the countershaft and the driven shaft are permanently coupled together.

It will be observed that the structure as so far described functions as follows: When the drive shaft 11 is accelerated in counterclockwise direction, inherent resistance to rotation of the nut member 13 causes it to remain relatively stationary as compared to the shaft 11, so that it is moved by the screw threads into the first position in which the gear 14 engages and drives the gear 17 in direction opposite to the direction of rotation of the drive shaft 11 and at a speed determined by the ratio between the number of teeth on the first gear 14 and the number of teeth on the second gear 17.

On the other hand, when the drive shaft 11 is rotated in clockwise direction, the nut member 13 is shifted into the second position, in which the gear 14 meshes with the third gear 18 on the counter shaft 19, driving the latter at a lower speed determined by the ratio of the number of teeth on the gear 14 to the number of teeth on the gear 18. The small gear 20 on the countershaft 19 drives the second gear 17 on the driven shaft 12 at a still lower speed because of the speed reduction effected between the relatively small gear 20 and the relatively large second gear 17. Under this last named condition, the driven shaft 12 is rotated at a lower speed relative to that of the drive shaft 11 than in the first instance, but the driven shaft 12 now rotates in the same direction as the drive shaft 11 because of the double reversal of direction, i. e. one reversal of direction between the gear 14 and the third gear 18 and the other reversal between the gear 20 and the second gear 17. However, since the shifting effect results from reversal of direction of the drive shaft 11, the driven shaft 12 always rotates in the same direction.

When the drive shaft 11 is accelerated from a standstill in either direction to reverse the position of the nut member 13 from the first to the second position, or vice versa, rotation of the nut member is initially restrained by the fact that it is coupled to the output shaft 12. Thus when the nut member 13 is in the second position as shown in Fig. 1, the gear 14 is meshing with the third gear 18 which is constantly coupled to the output shaft 12. There is therefore a positive force restraining the nut member from rotation and it travels along the threads 11a rapidly toward the first position. However when the nut member reaches an intermediate position, the first gear 14 is not meshed with either the third gear 18 or the second gear 17, and it might then tend to accelerate rapidly to the speed of the drive shaft 11 without completing its axial movement into the first position. To prevent such action a brake mechanism is provided.

This brake mechanism includes the brake hub 15, hereinafter designated as the first brake hub, and a cooperating first brake shoe 22 on one end of a lever 23 which is fulcrumed intermediate its ends on a screw 24 extending from the casing wall 10a. At its opposite end, the lever 23 carries a second brake shoe 25 which is juxtaposed to a second brake hub 27 mounted on the side of the third gear 18.

When the nut member 13 is in either extreme position, the first brake hub 15 is misaligned with the first brake shoe 22, in which position neither one of the brake shoes is forced against its associated brake hub. However as the hub member 13 moves out of its first or second extreme position into the intermediate position (in which the gear 14 is out of mesh with both the third gear 18 and the second gear 17) the first brake hub 15 rides under the first brake shoe 22, forcing the latter outwardly and rocking the lever 23 to cause the second brake shoe 25 to bear against the second brake hub 27. This therefore creates friction both between the first brake shoe 22 and the first brake hub 15 and between the second brake shoe 25 and the second brake hub 27, thereby adding frictional resistance to the rotation of both the nut member 13 and the driven shaft 12 and the countershaft 19. The effect of the brake load on the nut member 13 is to resist rotation of the latter with the drive shaft 11, so that it travels without interruption into its other extreme position in which it again meshes with either the third gear 18 or the second gear 17 depending upon which direction it is going. The effect of the brake friction of the second brake shoe 25 on the second brake hub 27 is to bring the driven shaft 12 and the countershaft 19 to a stop, and thereby prevent reverse motion between the first gear 14 and the second or third gear 17 or 18 with which it is to be meshed, as it moves out of the intermediate position. This braking of the driven shaft 12 and the countershaft 19 is desirable because during the initial acceleration of the drive shaft 11, while the first gear 14 is meshed with say the third gear 18, it tends to drive the driven shaft 12 in the reverse direction to that in which it is intended to rotate. Such reverse rotation would promote clashing between the gear 14 and the gear 17 when it engages the latter.

Although for the purpose of explaining the invention, a particular embodiment thereof has been shown and described, obvious modifications will occur to a person skilled in the art, and we do not desire to be limited to the exact details shown and described.

We claim:

1. A transmission comprising: a drive shaft; a driven shaft; a countershaft; said drive shaft having screw threads thereon; a nut member threadedly engaging said drive shaft for axial movement therealong between first and second positions in response to rotation of said drive shaft with respect to said nut member; a first gear on said nut member; a second gear on said driven shaft axially located to mesh with said first gear when said nut member is in said first position; a third gear on said countershaft axially located to mesh with said first gear when said nut member is in said second position, said first gear being out of mesh with said second and third gears when said nut member is in a position intermediate said first and second positions; gear means coupling said countershaft and output shaft for rotation in opposite directions; said first gear member having a brake hub thereon; a brake shoe cooperating with said first brake hub; and means supporting said brake shoe in fixed axial position such as to engage said hub only when said nut member is in said intermediate position.

2. A transmission according to claim 1 in which said brake shoe supporting means comprises a lever fulcrumed between its ends and having said one brake shoe on one end and having a second brake shoe on the other end; and a second brake hub operably coupled to said output shaft and so operatively related to said second shoe that pressure on said first shoe by said first hub urges said lever in direction to apply said second shoe to said second hub.

3. A transmission according to claim 2 in which said second brake hub is on said countershaft.

References Cited in the file of this patent

UNITED STATES PATENTS

| 1,555,248 | Hansen | Sept. 29, 1925 |
| 1,991,756 | Lazich | Feb. 19, 1935 |
| 2,505,841 | Shuker | May 2, 1950 |

FOREIGN PATENTS

| 226,296 | Switzerland | Mar. 31, 1943 |